Figure 1:
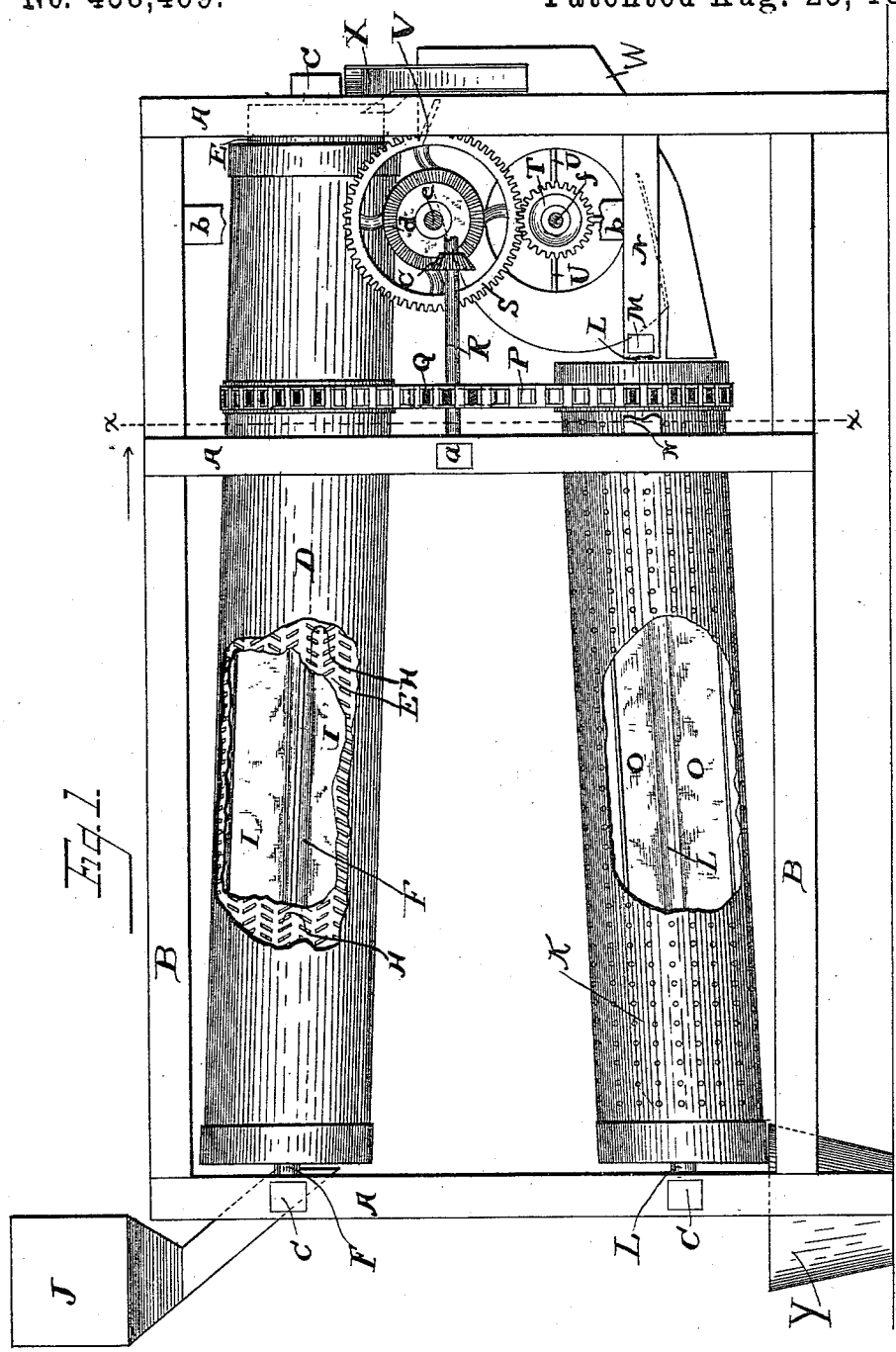

(No Model.) 2 Sheets—Sheet 1.

D. E. LOGER.
FLAXSEED SEPARATOR.

No. 458,469. Patented Aug. 25, 1891.

Witnesses
C. E. Hunt
Alfred T. Gage

Inventor
David E. Loger
by W. D. Henderson
Attorney

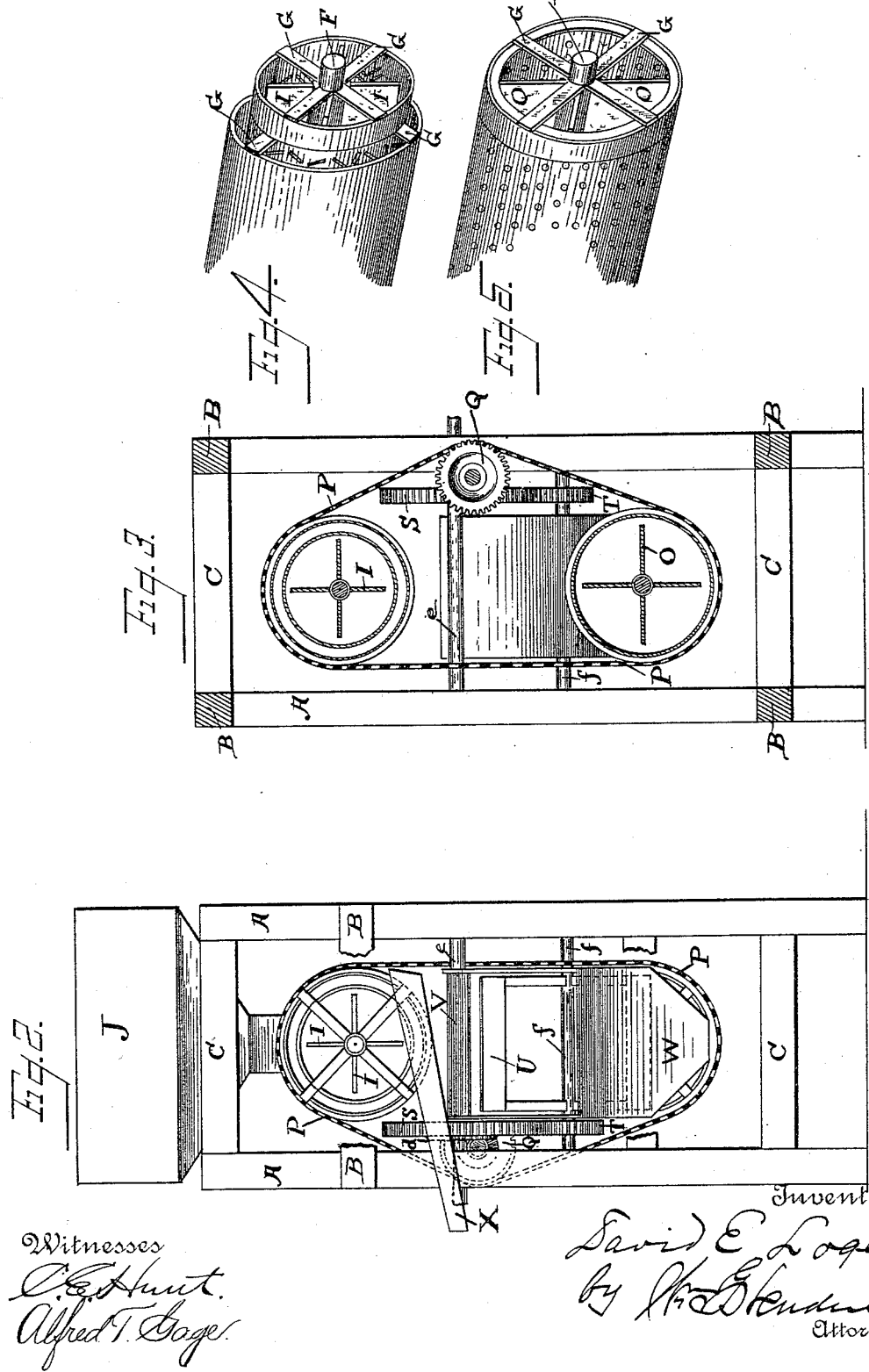

UNITED STATES PATENT OFFICE.

DAVID E. LOGER, OF OCHEYEDAN, IOWA.

FLAXSEED-SEPARATOR.

SPECIFICATION forming part of Letters Patent No. 458,469, dated August 25, 1891.

Application filed October 27, 1890. Serial No. 369,477. (No model.)

*To all whom it may concern:*

Be it known that I, DAVID E. LOGER, a citizen of the United States, residing at Ocheyedan, in the county of Osceola and State of Iowa, have invented certain new and useful Improvements in Flaxseed-Separators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to flaxseed-separators, and has for its object to construct a separator which will thoroughly, quickly, and in a simple manner separate the flaxseed from the mustard-seed and other foreign matter.

To the accomplishment of such ends the invention consists in the construction and the combination of parts hereinafter particularly described and claimed, reference being had to the accompanying drawings, forming a part hereof, in which—

Figure 1 is a side elevation of the machine with portions of the cylinders broken away to show the interior thereof. Fig. 2 is a front end elevation of the machine. Fig. 3 is a cross-section taken on the line $x\,x$ of Fig. 1, looking in the direction of the arrow. Fig. 4 is a perspective of the discharge-end portion of the upper cylinders of the machine. Fig. 5 is a perspective of the receiving end of the lower cylinder.

In the drawings, the letter A designates upright timbers, B longitudinal timbers, and C cross-timbers, which constitute the frame-work of the machine. In the upper part of this frame-work are supported two cylinders D and E, one being within the other, with a space between them. They are suitably journaled in the frame-work on the shaft F, which is illustrated as passing through the inner cylinder and having its bearings in the upper cross-timbers C. The inner and outer cylinders are connected together by the arms G, which may also extend across the inner cylinder E and be connected to the shaft F. The inner cylinder at its discharge end preferably extends beyond the outer cylinder, as illustrated, and is formed throughout its length with a series of elongated openings H, which will permit the flaxseed to pass through, while preventing the passage through them of the larger foreign grain or seed. These apertures or perforations, besides being elongated and of the shape shown, are also arranged as illustrated—that is, in parallel rows, each row being composed of two lines, with the perforations diverging or extending in opposite oblique lines from an imaginary line drawn lengthwise of the row next to the contiguous ends of the perforations, as illustrated. By this arrangement the flaxseed are caught as they fall onto the surface of the cylinder and pass through the same, while the foreign seed will be held in the cylinder until discharged at the end. The outer cylinder is imperforate, so that the flaxseed cannot drop through the same, but must be discharged at its end. The shaft F, which passes through the cylinder, also carries a series of arms or blades I, which turn with the cylinder and serve to lift the seed and let them drop onto the surface of the cylinder, so as to keep the same stirred up, the better to effect the separation. The upper cylinders are inclined from their front, where the inner cylinder receives the flaxseed from a hopper J to its discharge end, and the lower cylinder inclines in the opposite direction to the upper cylinders, as illustrated. The lower cylinder (designated by the letter K) is perforated with a series of round holes and is supported by a shaft L, which is journaled at one end in the cross-timber C and at the other end in the cross-bar M, supported at opposite ends in bars N, extending longitudinally of the frame and supported by upright timbers thereof, as shown. The cylinder K is provided with a series of blades or arms O for the purpose of stirring up the seed in the cylinder. Both the upper and the lower cylinders revolve, and motion is received by both from a chain P, which derives motion through a sprocket-pinion Q, mounted on a shaft R, which has one end journaled in a cross-bar $a$ and the other in an upright or post $b$, parts of which are broken away in Fig. 1. This shaft R also carries a bevel-pinion $c$, which meshes with a bevel-gear *d* and receives motion therefrom. The shaft *e*, to which the gear *d* is attached, is journaled in the posts *b* and is given motion by either a hand-crank or a band-pulley, neither of which is shown. This shaft also carries a cog-wheel S, which gears with a cog-pinion T, so as to transmit motion to the shaft *f* of a fan U. This fan U is located at the end of the lower cylinder between it and the end of the upper cylinder, the space being formed by setting the lower cylinder back of the discharge end of the upper cylinder, as illustrated in Fig. 1. The sides W of the fan-casing are extended in front of the frame of the machine and the discharge end of the upper cylinders, (shown in Fig. 1,) so that the flaxseed falling from the space between the inner and outer upper cylinders will drop down between the extended sides and be subjected to the fan-blast for the purpose of blowing away the foreign matters that may be mixed with the flaxseed that is falling from the upper to the lower cylinder. The flaxseed as it leaves the upper cylinders passes onto a board V, and by that is directed into the open space between the extended sides of the fan-casing, and after being subjected to the fan-blast it drops onto an inclined chute W, which may be the discharge-flue from the fan, and by it is carried and delivered into the end of the lower cylinder K. The larger foreign matters which pass out of the end of the inner of the two upper cylinders run into a trough X, and by it are led away from the machine.

From the foregoing description it will be seen that the mechanism which drives the fan also transmits motion to both the upper and the lower cylinders, and that by locating the fan at the end of the lower cylinder the flaxseed is subjected to an air-blast as it falls from the upper to the lower cylinder, so as to free it from the lighter foreign matter, which will be blown off while the flaxseed will run into the lower cylinder.

In operation the flaxseed mixed with the foreign matter passes from the hopper J into the elevated end of the inner cylinder E, and as the latter is revolved the mass of seed is carried around and kept stirred up by the blades I, and owing to the inclination of the cylinder travels along toward the lower end thereof. During this operation the flaxseed drops through the openings H in the inner cylinder into the space between that cylinder and the outer imperforate cylinder, while the coarser mustard and other seed travels to the end of the perforated cylinder and runs into the trough X, whence it passes off from the machine into any receptacle that may be provided therefor. The flaxseed which passes into the space between the two cylinders is by the inclination of the cylinder fed to its lower end, whence it falls onto the board V, which directs it in a thin stream into the space between the extended sides of the fan-casing. As it falls into that space, it is subjected to the air-blast from the fan, by means whereof any impurities that may be mixed with the flaxseed are blown off, while the flaxseed drops into the chute W and by it is directed into the elevated end of the lower perforated cylinder K. In this cylinder it is carried around and agitated by the blades O and delivered at the lower end of the cylinder into a suitable receptacle Y. Any small mustard-seed that may have remained in the flaxseed after subjection to the air-blast passes off through the round perforations, while the flaxseed is delivered in a clean and purified state.

The mechanism is not only simple in its construction, but very efficient in operation.

I have described what I consider to be the best construction and arrangement of parts; but it is obvious that changes can be made without departing from the spirit of my invention.

Having described my invention and set forth its merits, what I claim is—

1. In a flaxseed-separator, the combination of the two upper cylinders, one arranged within the other, with the inner one formed with elongated perforations arranged in parallel rows, each row being composed of two lines of perforations, with the perforations extending in opposite oblique directions, and the perforated cylinder located below the upper cylinders, substantially as and for the purposes set forth.

2. In a flaxseed-separator, the combination of the two upper cylinders, one located within the other and formed with the elongated perforations arranged in parallel rows, each row being composed of two lines of perforations, with the perforations extending in opposite oblique directions and extended beyond the end of the outer cylinder, and the perforated cylinder located below the upper cylinders, with its end back of the delivery ends of the upper cylinders, substantially as and for the purposes set forth.

3. In a flaxseed-separator, the combination of the two upper cylinders rotatable together, one located within the other and perforated, the perforated cylinder located below the upper cylinders, a fan at the end of the lower cylinder adjacent to the discharge end of the upper cylinder, with the sides of the casing extended beyond the end of the upper cylinders to direct an air-blast against the seed falling from the upper to the lower cylinder, and a chute extending from the forward end of the fan under the same to the lower cylinder for conveying the material from the upper to the lower cylinder after being subjected to the air-blast, substantially as and for the purposes described.

4. In a flaxseed-separator, the combination of the upper cylinders, one located within the other and connected to revolve together, the lower perforated cylinder, the sprocket-chain passing around the upper and the lower cylinders, the fan located at the end of said cylinders between the delivery end of one and the receiving end of the other cylinder, and means connecting the fan-operating mechanism with the sprocket-chain to revolve said cylinders, substantially as and for the purposes set forth.

In testimony whereof I affix my signature in presence of two witnesses.

DAVID E. LOGER.

Witnesses:
    JOHN D. LOGER,
    A. F. BUCHHOLZ.